Figure 1:
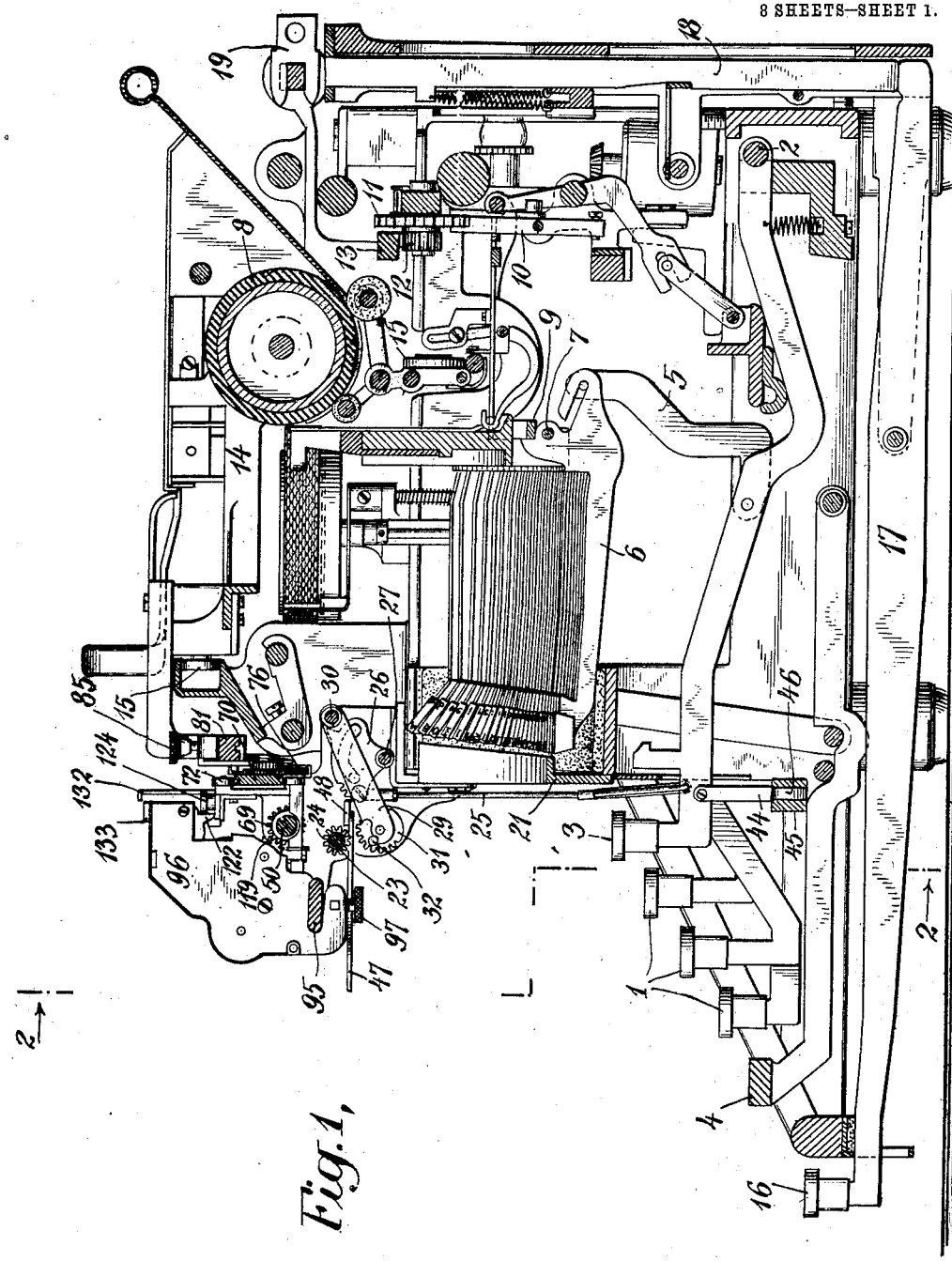

C. E. PRATT.
CALCULATING MACHINE.
APPLICATION FILED DEC. 19, 1910.

1,006,787.

Patented Oct. 24, 1911.

8 SHEETS—SHEET 1.

WITNESSES:

INVENTOR
C. E. Pratt
BY
ATTORNEY

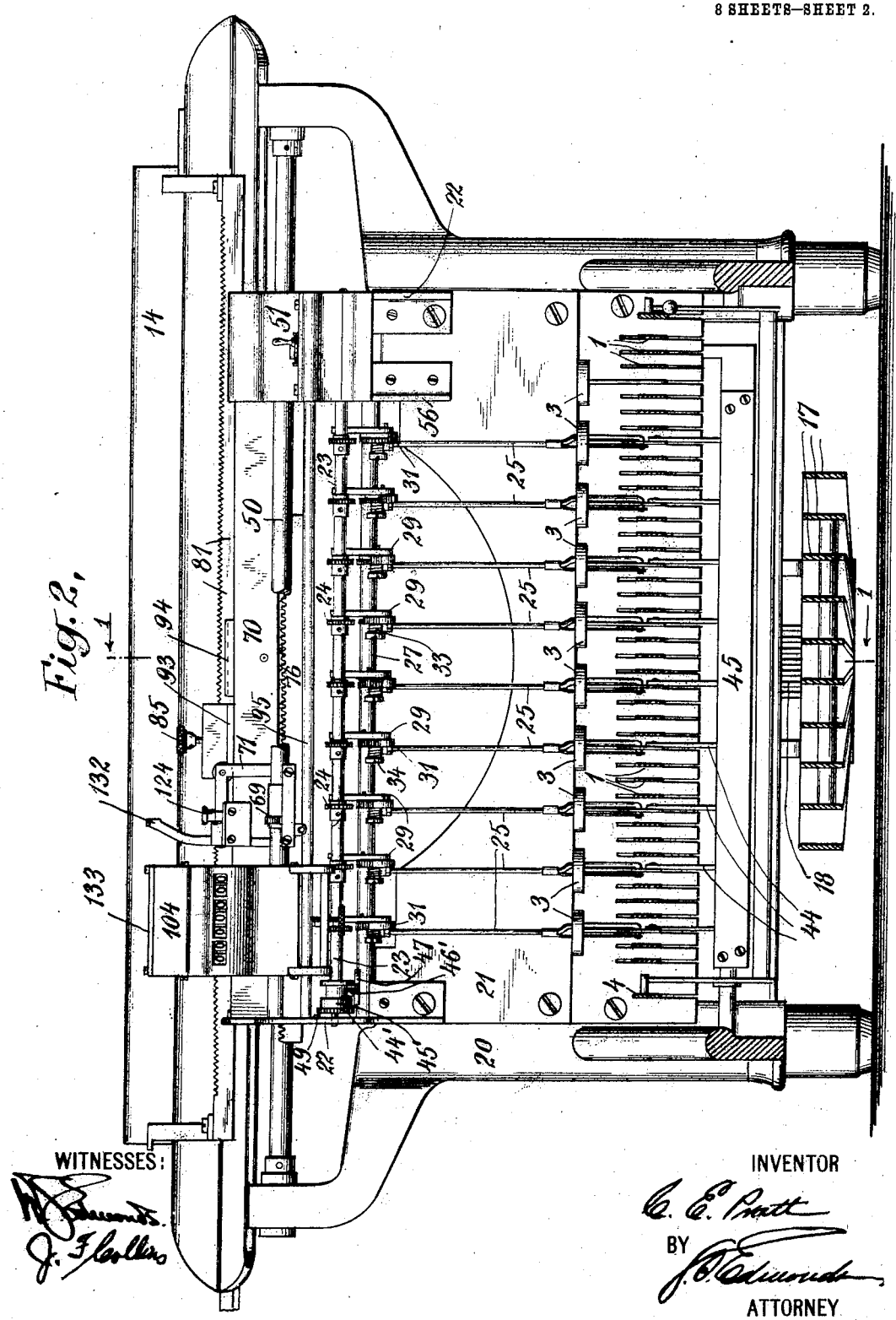

C. E. PRATT.
CALCULATING MACHINE.
APPLICATION FILED DEC. 19, 1910.
1,006,787.
Patented Oct. 24, 1911.
8 SHEETS—SHEET 3.
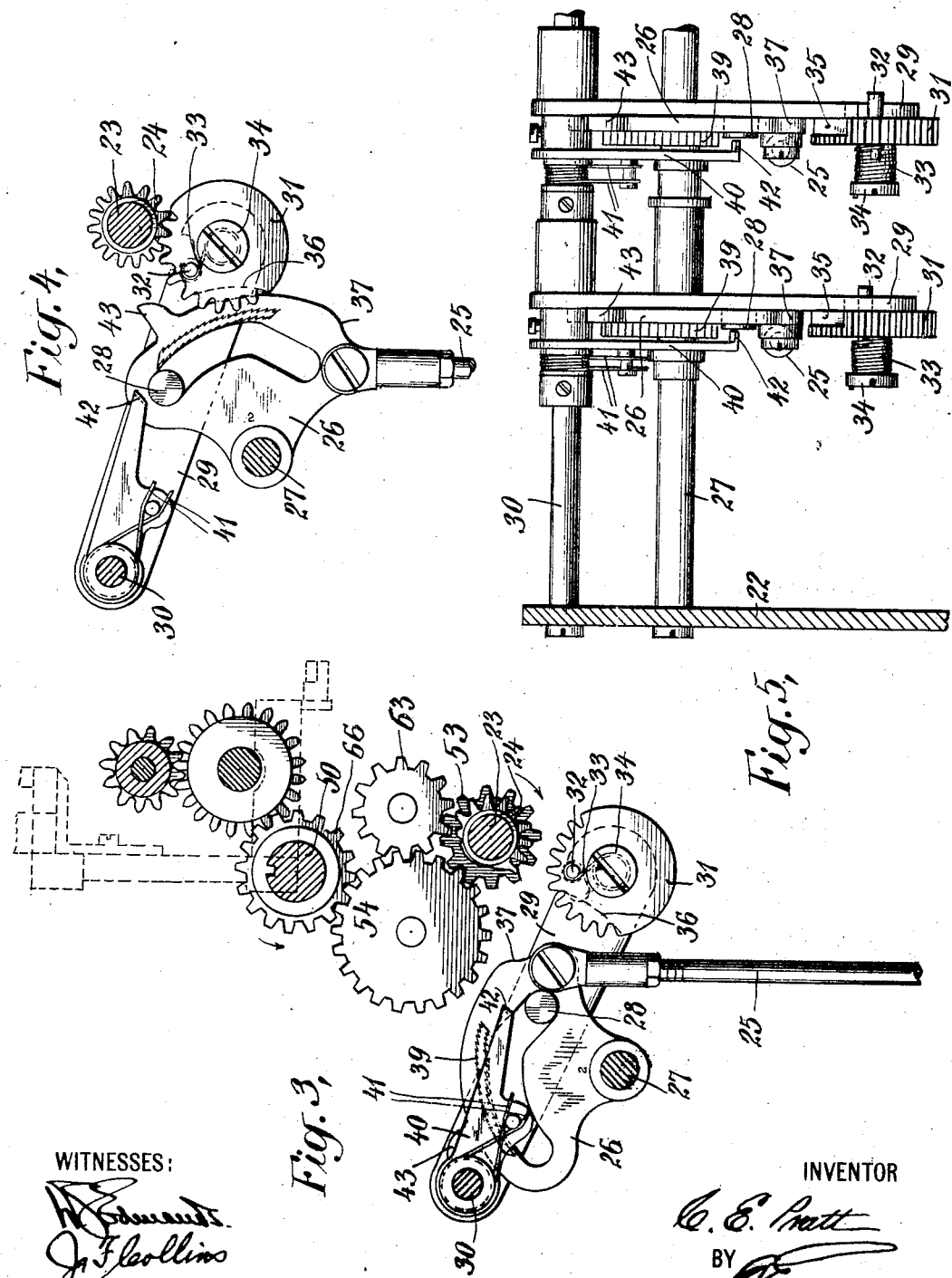
WITNESSES:
INVENTOR
C. E. Pratt
BY
ATTORNEY

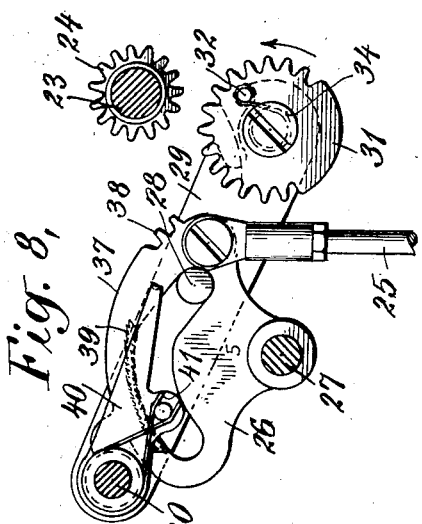
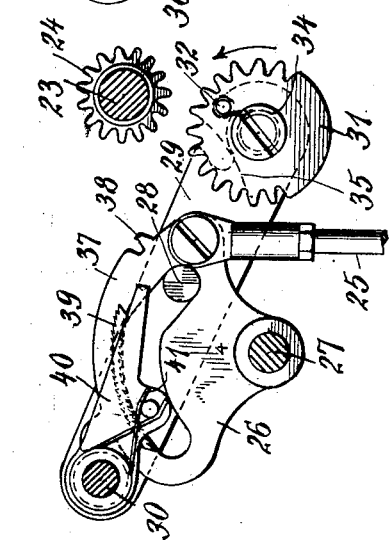
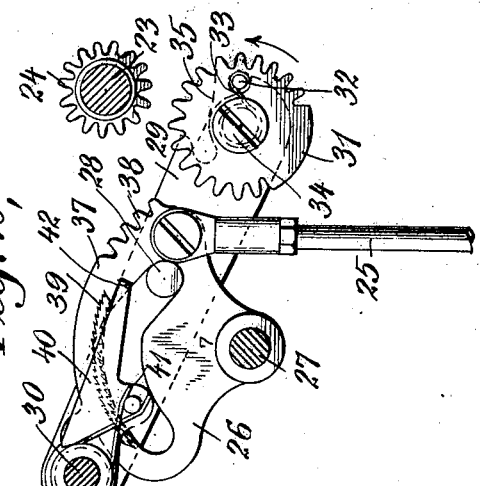
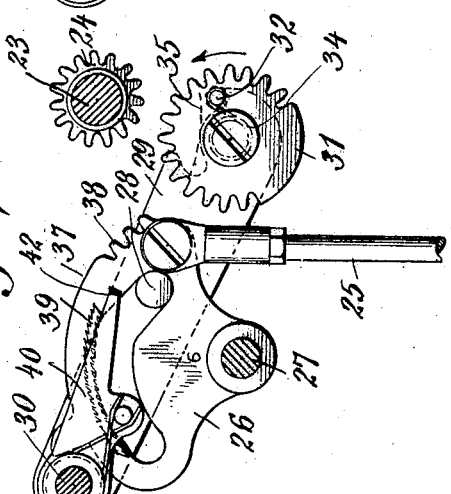
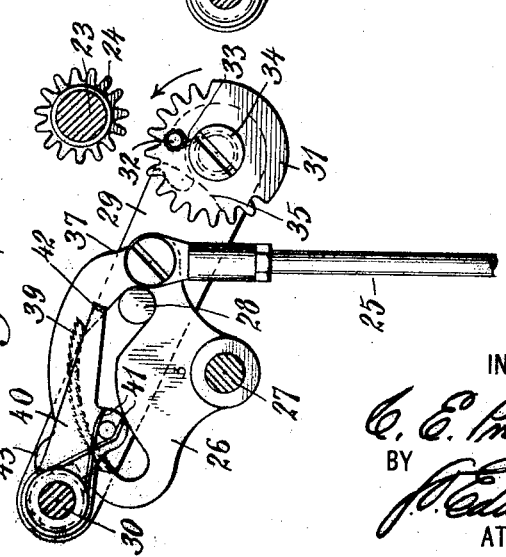

C. E. PRATT.
CALCULATING MACHINE.
APPLICATION FILED DEC. 19, 1910.
1,006,787.
Patented Oct. 24, 1911.
8 SHEETS—SHEET 5.
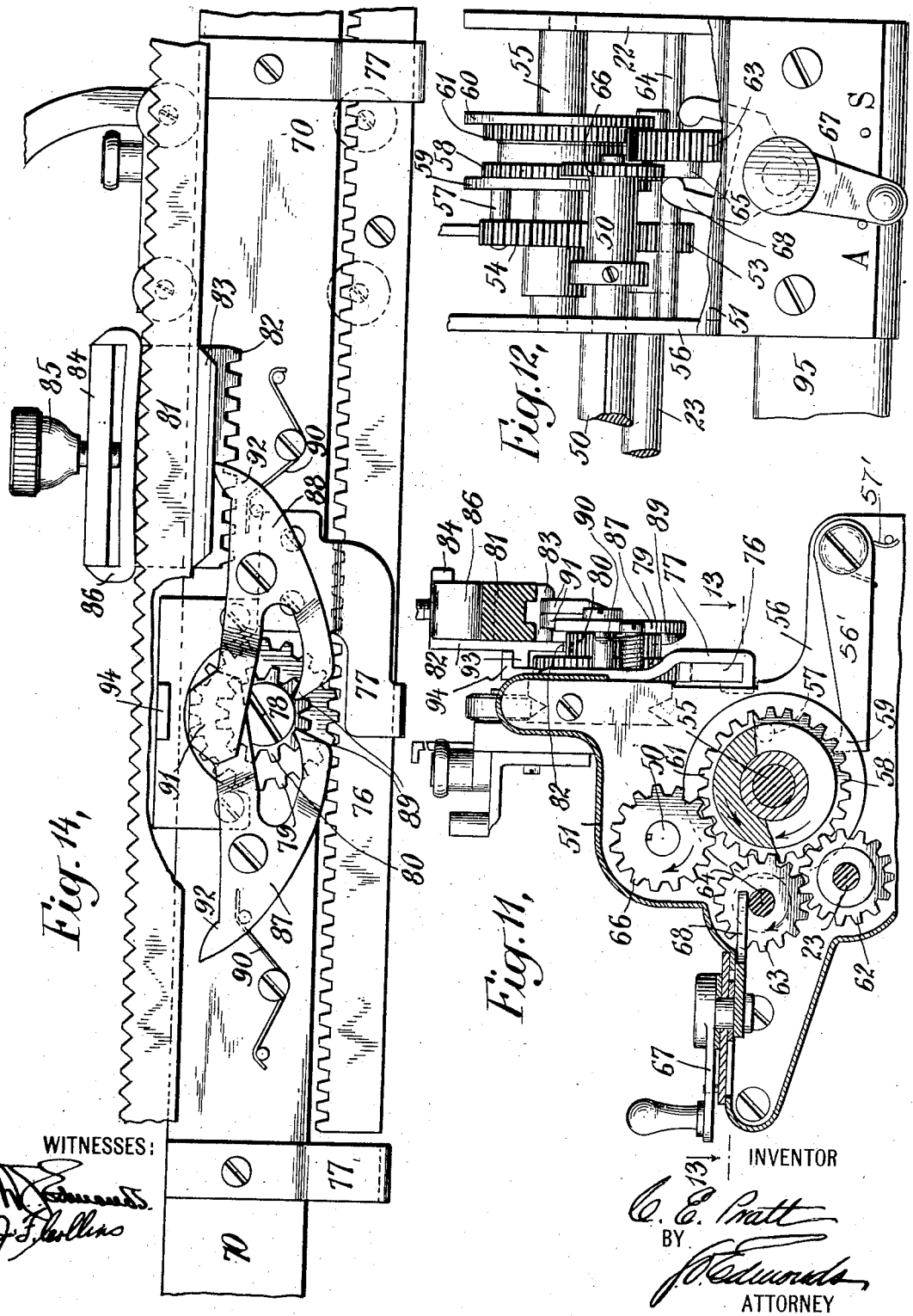

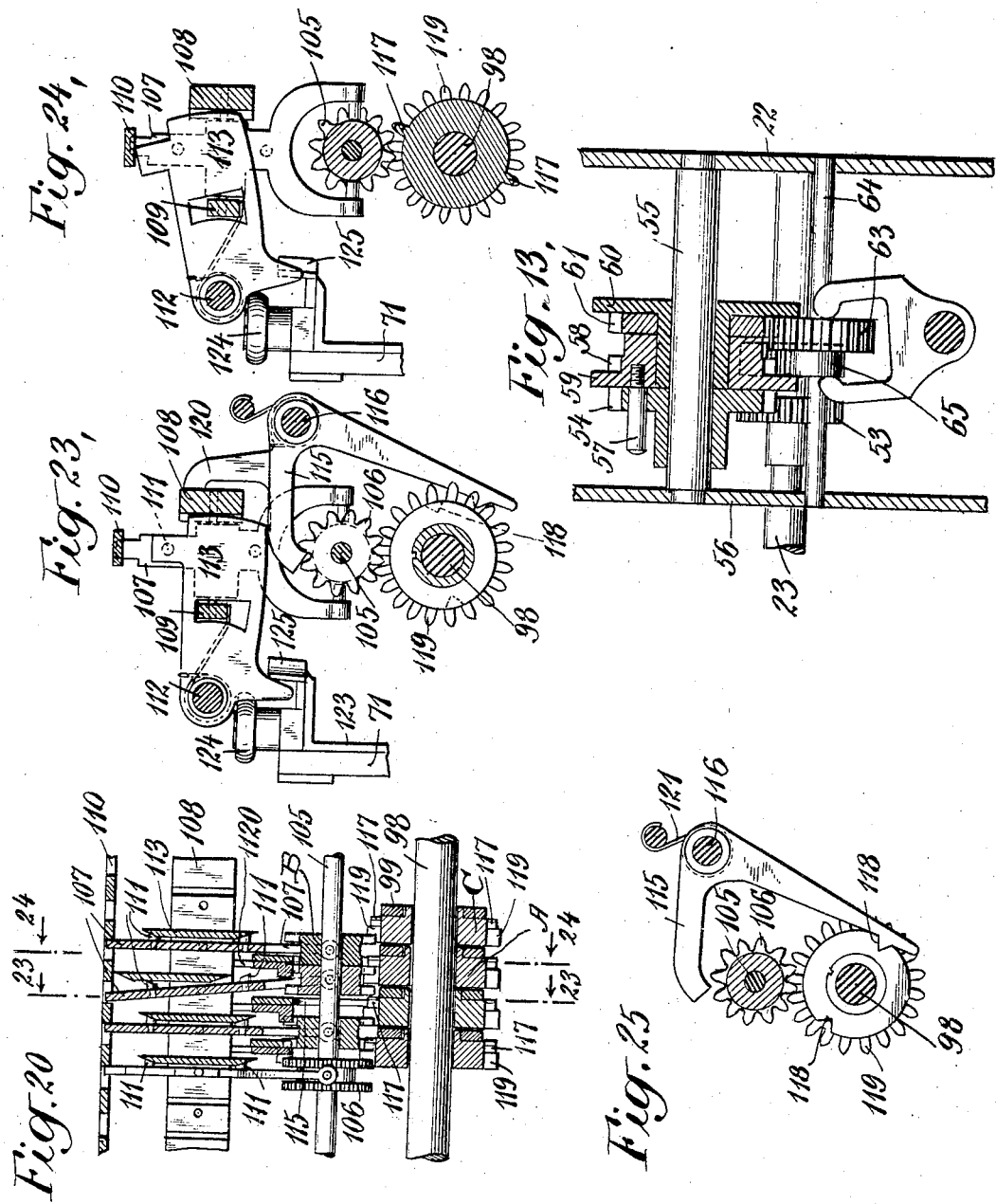

C. E. PRATT.
CALCULATING MACHINE.
APPLICATION FILED DEC. 19, 1910.
1,006,787.
Patented Oct. 24, 1911.
8 SHEETS—SHEET 7.
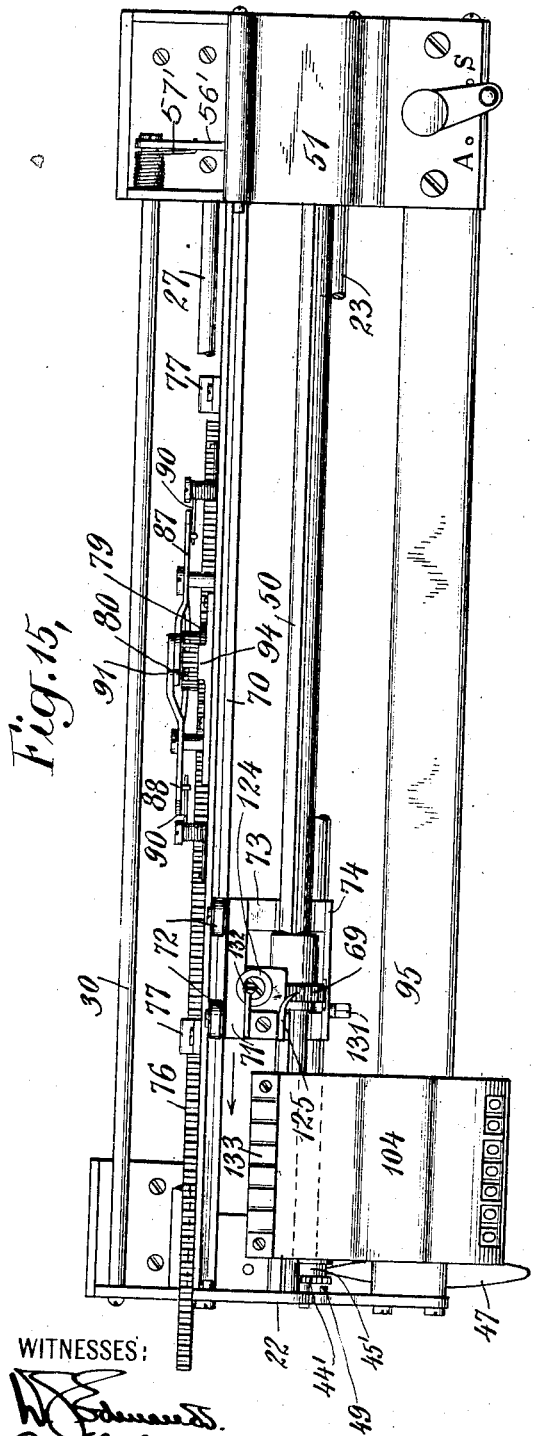
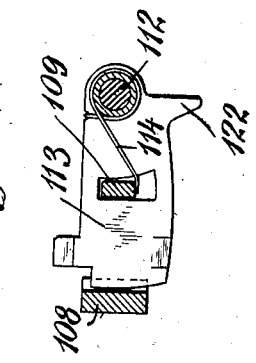
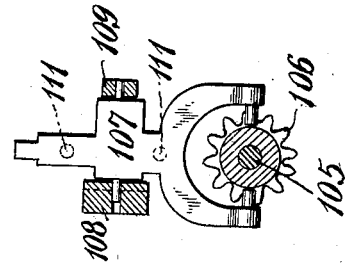
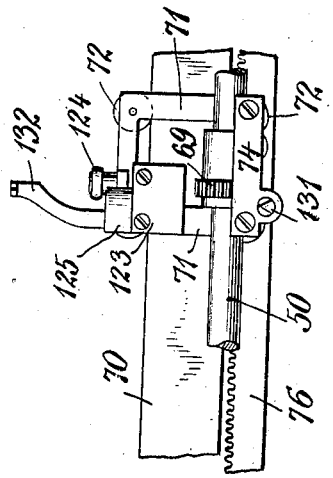
WITNESSES:
INVENTOR
C. E. Pratt
BY
ATTORNEY

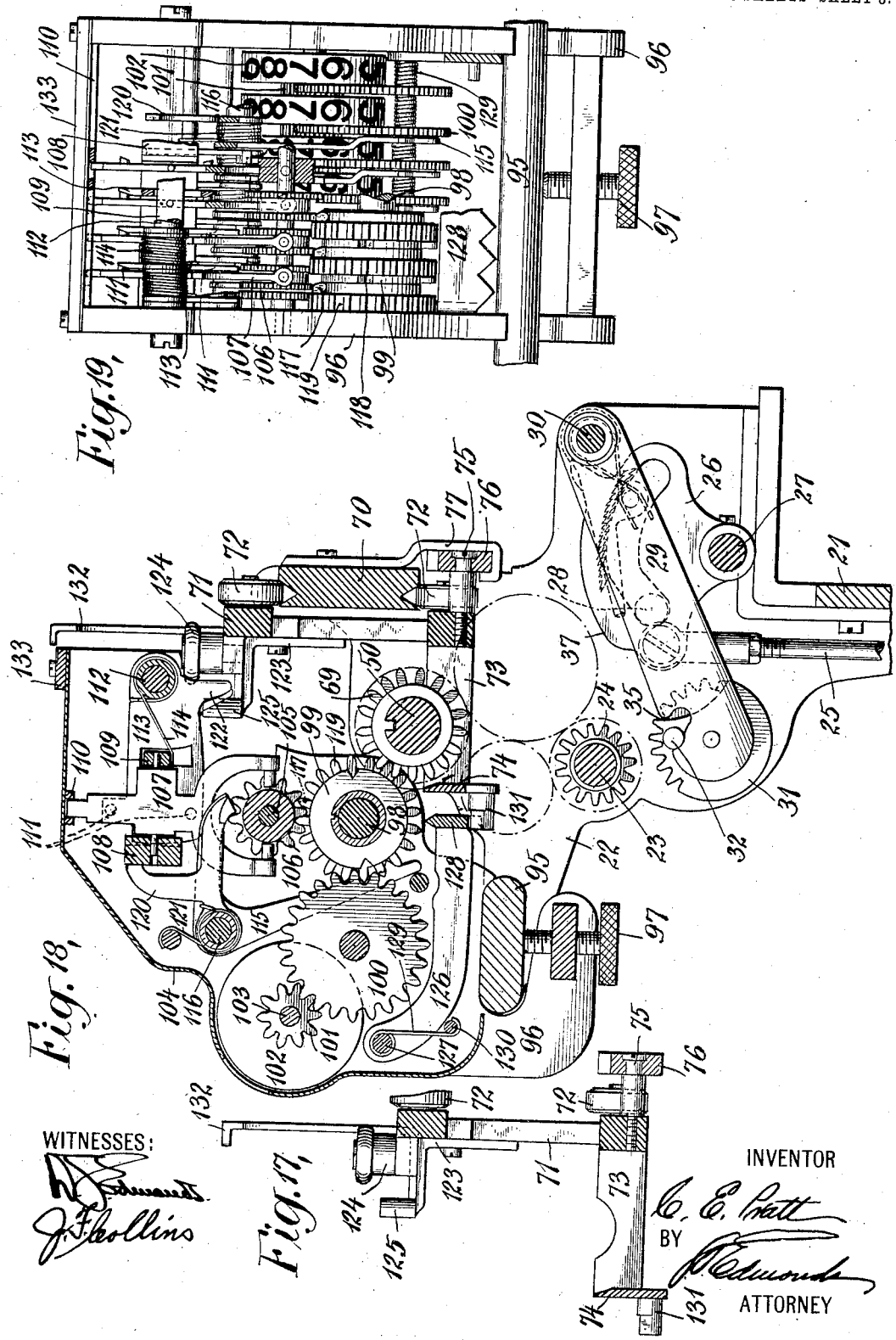

UNITED STATES PATENT OFFICE.

CHARLES E. PRATT, OF CHICAGO, ILLINOIS, ASSIGNOR TO A. B. DICK COMPANY, OF CHICAGO, ILLINOIS, A CORPORATION OF ILLINOIS.

CALCULATING-MACHINE.

1,006,787.  Specification of Letters Patent.  Patented Oct. 24, 1911.

Application filed December 19, 1910. Serial No. 597,985.

*To all whom it may concern:*

Be it known that I, CHARLES E. PRATT, a citizen of the United States, residing at Chicago, in the county of Cook and State of Illinois, have invented certain new and useful Improvements in Calculating-Machines, of which the following is a specification.

This invention relates to calculating machines, adapted particularly for performing the operations of addition and subtraction and indicating or recording the result.

The object of the invention is to provide a mechanism of this character which is reliable in operation, which is of simple and strong construction, which may be easily and rapidly operated and which can be manufactured and assembled at comparatively low cost.

The invention involves numerous novel features which will be hereinafter described and claimed, these including the general construction and the arrangement of the parts of the machine and the construction of the individual elements and groups of parts. Thus, a novel key-actuated mechanism is provided whereby a shaft is rotated a distance corresponding to the key depressed, and this mechanism is simple in construction, occupies but little space, is reliable and positive in its action and over-running of the movable parts thereof in either direction due to momentum is positively prevented. A stationary totalizer is employed, as its indications can be read more easily than when a movable totalizer and stationary actuating mechanism are employed, and this stationary totalizer is of an improved construction involving many features of novelty and value; thus, each of the several number-wheels of the totalizer is locked against movement at all times except when the actuating mechanism is moved into position for actuating a wheel, whereupon that particular wheel will be unlocked and if it is necessary to carry over from one wheel to the next higher wheel such higher wheel will be unlocked just long enough to permit its operation. In this way, erroneous calculations due to accidental displacement or actuation of a number-wheel are prevented.

I have illustrated an embodiment of my invention in the accompanying drawings as applied to a typewriting machine, and this is a use for which the improved mechanism is particularly well adapted; but I wish it understood that the invention is in no way limited in this respect, as the invention may be employed in a simple calculating and indicating machine, such a machine provided with a listing attachment, or other forms of calculating machines.

Furthermore, the invention is not limited to the use of the several mechanisms herein shown in combination, as many of these mechanisms may be used in connection with devices quite different from those herein shown; thus my improved totalizer or the improved key-actuated devices may be used in the forms herein shown in machines of various constructions and for various uses.

In the drawings, Figure 1 is a central section of the machine on line 1—1 of Fig. 2; Fig. 2 is a transverse sectional elevation on line 2—2 of Fig. 1; Fig. 3 is a detail view of one of the key-actuated mechanisms; Fig. 4 is a view of certain of the parts shown in Fig. 3, illustrating the other positions of those parts; Fig. 5 is a horizontal section, showing the key-actuated mechanisms; Figs. 6, 7, 8, 9 and 10 are views showing five of the key-actuated mechanisms; Fig. 11 is a vertical longitudinal section through the reversing gearing; Fig. 12 is a plan view of the same, broken away in part; Fig. 13 is a section on line 13—13 of Fig. 11; Fig. 14 is a view of the mechanism for actuating the master-pinion; Fig. 15 is a top view of a portion of the calculating mechanism; Fig. 16 is a front view of the carriage for the master-pinion; Fig. 17 is a section of the carriage shown in Fig. 16; Fig. 18 is a section through the totalizer; Fig. 19 is a view of the totalizer from the rear thereof, broken away in part; Fig. 20 is a longitudinal section through the totalizer; Figs. 21 and 22 are detail views of parts of the totalizer; Figs. 23 and 24 are sections through the totalizer on lines 23—23 and 24—24 respectively; and Fig. 25 is a detail view of one of the locks of the totalizer.

The calculating mechanism is shown in the drawings as applied to a typewriting machine having the numeral-keys arranged in a row extending across the machine at the back of the keyboard. In its general construction, the calculating mechanism comprises a shaft extending across the machine parallel to this row of numeral-keys and above the same, this shaft carrying a number of gears, and a plurality of actuating mechanisms, each operated by one of the numeral-keys to move into engagement with a gear on this shaft, actuate the gear and then return to initial position. This shaft is geared to a second shaft extending parallel thereto and carrying a master-pinion which is adapted to slide upon it in accordance with the movement of the typewriter carriage, and this gearing between the two shafts is preferably so arranged that it may be reversed as desired, in order to adapt the machine for performing operations either in addition or subtraction. The totalizer is mounted upon a bar extending across the machine, and is so arranged that it may be affixed thereto in any desired position, and the numeral-wheels of this totalizer are adapted to be engaged successively and operated by the master-pinion as the latter is moved along from left to right as the carriage of the typewriter moves from right to left.

Referring now to the drawings, a typewriting machine of well known construction is shown, this machine having a plurality of keys 1, the key-bars of which are pivotally mounted upon a shaft 2 extending across the machine. The row of keys 3 at the rear of the keyboard are the numeral-keys. 4 indicates the spacing-bar. When any key is depressed, it operates through a link 5 to turn a key-bar 6 about the pivotal axis 7 of all of the key-bars, so as to cause the type on that key-bar to print on the paper passing around the impression-roller 8. Also, when any key-bar is operated, it turns the pivotally-mounted member 9, so as to actuate the escapement-pawl 10, this pawl coacting with an escapement-wheel 11, so that when operated it allows the wheel 11 to move the distance represented by one of the teeth thereon. The escapement-wheel 11 is on the same shaft with a pinion 12 which coacts with a rack 13 secured to the carriage of the typewriting machine, so that the escapement governs the movement of the carriage from right to left, this movement being caused by a spring in the usual manner. The spacing-bar 4 is also arranged to operate the escapement. The carriage of the typewriting-machine is shown at 14, this being arranged to move upon rollers 15 which run on suitable supports mounted upon the frame of the machine. A plurality of tabulating keys are shown at 16, these being mounted on levers 17 arranged to operate links 18, and also to release the escapement, the links 18, when so operated, being projected into the path of stops 19 adapted to be adjustably mounted upon a bar carried by the carriage of the machine at the rear thereof.

Secured to the front corner-posts 20 of the frame of the machine, is a base-plate 21, at the lateral edges of which are side-plates 22 supporting portions of the calculating mechanism. In these side-plates is journaled a shaft 23 carrying a plurality of gears 24. A plurality of mechanisms are provided, each actuated by one of the numeral-keys and each adapted to engage and operate one of these gears 24 and the shaft 23, and the extent to which shaft 23 is actuated by these mechanisms corresponds to the value of the key depressed. One of these mechanisms will be described in connection with Figs. 3, 4 and 5 of the drawings, and then the differences between the several key-actuated mechanisms will be pointed out.

Each numeral-key is connected by a rod 25 to a digit-piece or sector 26 pivotally mounted upon a shaft 27 extending between the side-frames 22. This sector has a cam-slot therein, the major portion of which is concentric with the shaft 27, but the forward end of which is turned toward that shaft. This cam-slot receives a pin 28 carried by a frame or support 29, the latter consisting of a strip of sheet-metal pivotally mounted at one end upon a shaft 30 extending between the side-frames 22. The support 29 and the sector 26 are prevented from moving laterally upon their supporting shafts by means of suitable collars secured thereto. At its forward or free end, the support 29 carries a driving gear 31, the teeth of which are adapted to mesh with the teeth of the gear 24 on shaft 23, which lies directly above the driving-gear 31. The driving-gear 31 need not have a full complement of teeth, as teeth are used only on a portion of the periphery of this gear. Extending through the gear 31 is a pin 32, to one end of which is secured the end of a spring 33, the other end of this spring being coiled about the pivot-pin 34 on which the gear 31 is mounted and secured thereto, so that the spring 33 exerts a tension upon the driving-gear to turn it in a clockwise direction, as seen in Figs. 3 and 4. The pin 32 projects beyond the face of the driving-gear 31 on the side opposite that on which the spring 33 is located, and this portion of the pin moves in a slot or notch formed in the supporting plate 29, so as to limit the rotational movement of the driving-gear relatively to the support in both directions. The driving-gear 31 is cut away, as shown at 35 in Fig. 5 and by the dotted line 36 in Fig. 3, this cutaway portion being of a width less than the width of the gear, so that the teeth of the gear are continued around this cutaway portion. The gear 24 on shaft 23 is of such size or is so disposed that it will be actuated by the teeth of the driving-gear 31 adjacent to the cutaway portion 35, as well as by the other teeth on the driving-gear. The periphery of the sector or digit-piece 26 is cut so as to provide a projecting portion 37 adapted to engage the wall 36 at the bottom of the cutaway portion 35 in the driving-gear 31. The sector 26 being of less width than the width of the cutaway portion 35 and being mounted so as to lie close to the adjacent face of the support 29, the projecting portion 37 thereof will enter the cutaway portion 35 and engage the bottom wall of the cutaway portion near the lower edge thereof. When the portion 37 does engage the driving-gear 31 thus, it will turn the gear in a counter-clockwise direction against the tension of the spring 33, but when it is desired to return sector 26 to its initial position, the return movement thereof can be effected without actuating the driving-gear 31 at all, for there has occurred no interlock of the sector 26 and the gear 31, such as would have occurred had gear-teeth been employed for actuating the driving-gear meshing with the teeth on that gear.

The key-actuated mechanism shown in Figs. 3 and 4, is that for the No. 2 key. The mechanisms for the Nos. 1 and 3 keys are like that shown for the No. 2 key with two exceptions only: First, the cutaway portions 35 on the driving gears 31 are somewhat differently disposed so that those driving gears will be moved from the position of rest the appropriate distance by the projecting portions 37 on the corresponding sectors 26; and second, the notch in the support 29 in which the stop-pin 32 moves is somewhat longer in the case of the mechanism for the No. 3 key and somewhat shorter in the case of the No. 1 key; the movement of the driving gear of the No. 1 mechanism is so short that the movement-limiting means for the pin 32 in that case is preferably a slot as shown at the left in Fig. 5. The mechanism for the No. 3 key is shown in Fig. 6. The position of the cutaway portion 35 in the case of the mechanism for the No. 1 key is such that the driving gear 31 will be moved a distance equal to one of the teeth thereon, in the case of the No. 2 driving gear the movement will be equal to two teeth and in the case of the No. 3 driving gear the movement will be equal to three teeth. In each of these cases the movement of the driving gear is effected by the projection 37 on the corresponding sector 26 engaging the bottom of the cutaway portion 35 and in that way operating the driving gear. A movement equal to three teeth of the driving gear can be readily obtained in this manner, but for greater movement I prefer to employ other and additional means for effecting a portion of the movement of the driving gear. The key-actuating mechanism for the No. 7 key is shown in Fig. 10 and from an inspection of this figure it will be seen that the teeth on the driving gear 31 extend around that gear in a counter-clockwise direction a substantial distance beyond the cutaway portion 35, and also, that four teeth 38 are provided upon the periphery of the sector 26 at the forward edge thereof adapted to engage and actuate the driving gear 31. By depressing the connecting rod 25, the teeth 38 engage and actuate the driving gear and as these teeth pass out of mesh with the driving gear, the projecting portion 37 comes into engagement with the bottom wall of the cutaway portion 35 and actuates the driving gear farther, the whole movement being a distance equal to seven teeth. The notch in the support 29 which receives the pin 32 is in this case made of substantially greater length as is shown in Fig. 10. Figs. 7, 8 and 9 show the key-actuated mechanism for the 4, 5 and 6 keys respectively; it will be seen that the sectors 26 in these cases are provided with one, two and three teeth 38 respectively and that the notches which receive the stop-pins 32 are progressively increased in length. With these three mechanisms the driving gears 31 will be actuated by teeth 38 a distance equal to one, two and three teeth respectively, whereupon the projecting portion 37 on the sector 26 will engage the bottom wall of the cutaway portion 35, and actuate the driving gear through the remainder of its appropriate movement.

Each of the digit-pieces or sectors 26 has a ratchet-plate 39 secured thereto, this being bent so that it lies substantially concentric with the shaft 27 though preferably its forward end extends slightly away from shaft 27; this ratchet-plate has ratchet teeth on both sides thereof, the teeth on one side being inclined in the direction opposite to those on the other side and the two ends of the ratchet plate are oppositely beveled. Pivotally mounted upon the shaft 30 at the side of each sector 26 is a pawl 40 acted upon by springs 41 to hold it yieldingly in a central position. The free end of the pawl 40 is turned laterally as shown at 42 and this lateral projection is beveled as shown. When the sector 26 is moved forwardly from the position shown in Fig. 3, the end 42 strikes the forward beveled end of pawl-plate 39, is depressed thereby and rides on the under surface of the pawl-plate and thus enforces complete forward movement of the sector 26 before it can be returned. At the end of the forward movement of the sector, the springs 41 move the pawl 40 upwardly slightly so that at the beginning of the return movement of the sector, the end 42 of the pawl strikes the rear beveled end of the pawl-plate and is raised thereby and thereafter the end 42 rides on the upper surface of the pawl-plate and thus insures complete return movement of the sector before it can be again moved forward. Preferably each sector 26 is provided with an upwardly extending projection 43 adapted to engage the shaft 30 or a collar thereon to limit the return movement of the sector 26. Each of the number keys 3 is preferably provided with a depending link 44 (Fig. 1) adapted to enter a ball-race 45 in which are a plurality of balls 46 of such size and so disposed that only one number key 3 can be depressed at a time.

The operation of this portion of the mechanism is as follows: When any number key is depressed it operates through the connecting rod 25 to turn the corresponding digit-piece or sector 26 forwardly. At the beginning of this forward movement and before the sector engages itself with the coöperating driving gear, the cam-slot in the sector operates on the pin 28 to raise the free end of the support 29 until the driving gear carried thereby comes into mesh with the coacting gear 24 on shaft 23 and the concentric portion of the cam-slot thereafter holds these gears in mesh. After the gears are in mesh, the sector comes into engagement with the driving gear 31 and turns that gear a distance corresponding to the value of the key depressed. In every case the movement of the driving gear is effected by the engagement of the projecting portion 37 with the bottom wall of the cutaway portion 35 in the driving gear 31 and in some cases the movement of the driving gear is additionally effected by one or more teeth on the periphery of the sector 26 meshing with and operating the teeth on the driving gear. By reason of this provision of the cutaway portion 35 with which the projecting portion 37 on the sector coöperates at the end of the forward movement of the sector, the latter will be free to retract without actuating the driving gear and entirely free thereof after it has reached the end of its forward movement by the completion of the depression of the number key and after that key has been released so that it may be returned by its spring. This return movement of the sector cannot be begun until the downward movement has been completed because of the provision of the pawl-plate 39 and coacting pawl 40. As the return movement of the key and sector 26 is nearing completion the cam-slot in the sector will operate the pin 28 to lower the supporting frame 29 and thus carry the driving gear 31 out of mesh with the gear 24 on shaft 23. As soon as the driving gear disengages gear 24 it is restored to its initial position by the spring 33. When a key is depressed, the corresponding driving gear will thus be positively actuated a predetermined amount and excessive movement of the driving gear due to momentum or to any other cause, is effectually and positively prevented by the provision of the pin 32 and the wall at the end of the notch in the frame 29 which limits the movement of the driving gear in the forward direction. The return movement of the driving gear when it disengages the gear 24 is also limited in the same way so that excessive movement in this direction is also prevented and each driving gear will be held normally in its proper position by the spring 33 retracting the key and holding it retracted with the pin 32 in engagement with the rear wall of the notch in the plate 29. It will thus be seen that I have provided a simple mechanism which may be readily installed upon a typewriting machine, whereby, on the depression of any one of the number keys, the shaft 24 extending across the frame of the typewriter, will be actuated an amount corresponding to the value of the key depressed; that this movement of the shaft 24 is effected by causing the key to first move a driving gear into mesh with a gear on that shaft, then actuate the driving gear the appropriate amount, then disengage the driving gear from the gear on that shaft and then return the driving gear to its initial position; and that a movement of the required amount in each case is assured, since the movement is effected positively, a full stroke in every case is enforced and over-running due to momentum or any other cause is positively prevented.

It is sometimes desirable to use the typewriting machine and to operate the number keys thereon without actuating the calculating mechanism and I have therefore provided means whereby the calculating mechanism may be rendered operative or inoperative, as desired. In the present instance, I have shown this means as comprising devices for moving the shaft 23 in the direction of its length so that when the driving gears 31 are raised by the depression of the keys, they will not come into mesh with the gears 24. Referring to Figs. 1, 2 and 15, it will be seen that the shaft 23 is arranged so that it can move axially in its bearings, and at one end it has secured to it a gear 44' and adjacent to the gear a collar 45' having a circumferential groove therein. This groove receives the pin 46' carried by an operating lever 47 which is pivotally mounted upon a projection 48 of the side-plate 22. By moving the lever 47 to one side or the other, the shaft 23 can be moved axially so that the gears 24 thereon will be in the plane of the driving gears 31 or laterally displaced from the planes of the driving gears. When shaft 23 is moved to carry the gears 24 out of the planes of the driving gears 31, the gear 44' is carried into mesh with a projection 49 on the side plate 22 so that not only will shaft 23 be disconnected from its operating devices but also it will be positively locked against movement by the parts 44' and 49.

The shaft 23 is arranged to drive another shaft on which is a sliding pinion moved back and forth upon its shaft in accordance with the movement of the typewriter-carriage and this sliding pinion is adapted to actuate the number-wheels of a totalizer. A simple form of gearing may be employed between shaft 23 and the shaft of the sliding pinion, but preferably this gearing is such that it may be reversed as desired in order to permit of using the calculating mechanism for addition or subtraction, at will. In the present instance the shaft of the sliding pinion is shown at 50, this shaft being mounted for rotation in bearings carried by the side-frames 22, and the gearing connecting the shafts 23 and 50 is arranged at the right of the machine inclosed within a suitable casing 51 as shown in Figs. 2 and 15. Referring now to Figs. 11, 12 and 13, it will be seen that the shaft 23 is provided with a pinion 53 which meshes with the gear 54 mounted upon a short shaft 55 extending between the side-plate 22 and an auxiliary frame-plate 56. This gear 54 has an opening therethrough in which slides a pin 57 carried by a gear 58 and causing gear 58 to turn always with gear 54. At the side of the gear 58 is a disk 59 and the gear and disk are secured to a hub at the end of which is a disk 60 of the same size as the disk 59. Rotatable upon this hub and between the gear 58 and the disk 60 is a gear 61. The shaft 50 carrying the sliding master-pinion enters the gear-casing and carries a pinion 66 which is adapted to mesh with one or the other of the gears 58 and 61. The gear 58 always rotates with the gear 54 by reason of the pin 57 connecting them, and between the gears 58 and 61, are interposed reversing gears so that gear 61 is always driven in the direction opposite that in which gear 58 is driven. On the end of the shaft 23 beyond the gear 53 is a gear 62 adapted to slide freely on shaft 23 and having a hub at its side so that the side of the gear engages the disk 59 and the hub engages the disk 60, the gear 62 being held thus always in mesh with the gear 58. On a shaft 64 extending between the side-plate 22 and the auxiliary plate 56 is a sliding gear 63 having an integral hub 65, this gear being held by the disks 59 and 60 always in mesh with the gear 61. And furthermore, the gears 63 and 62 are of such width that they overlap and are always in mesh. Pivotally mounted on the casing 51 is a handle 67 having arms 68 at its inner end embracing the pinion 63 and adapted to move it and through it the parts 62, 60, 61, 58, 59 and 57 laterally to the position in which these parts are shown in Fig. 13 or to the position in which these parts are shown in Fig. 12. When handle 67 is in the position shown in Fig. 12 where it is arrested by a pin marked "A" for addition, the shaft 50 of the sliding master-pinion is driven in one direction by the shaft 23 through the parts 53, 54, 57, 58 and 66. When lever 67 is moved to the opposite position, shown in Fig. 13, where it is arrested by a pin marked "S" for subtraction, the shaft 50 of the sliding master-pinion is driven in the opposite direction by the shaft 23 through the parts 53, 54, 57, 58, 62, 63, 61 and 66.

I have described the reversing mechanism here illustrated in the drawings in detail, but any other suitable form of reversible gear connection between the shafts 23 and 50 may be employed.

The auxiliary frame-plate 56 may be used to support one end of certain of the shafts, as the shafts 50, 27 and 30, instead of carrying those shafts through it and to supporting openings or bearings formed in the adjacent side-plate 22. In the drawings, this construction is shown. The shaft 30 may be extended through its supporting opening in plate 56 as shown in Figs. 11 and 15 and on its end may be loosely pivoted a latch 56' held by a spring 57' in engagement with the gear 54 to prevent accidental operation of that gear in one direction.

The master-pinion is shown at 69, this being arranged to slide back and forth upon the shaft 50 and to rotate with that shaft, the pinion being supplied with a suitable spline extending into a groove in the shaft. The pinion is arranged to move from left to right upon the shaft in accordance with the movement of the typewriter-carriage from right to left. The means by which this movement of the pinion is effected, will now be described. Extending between the side-plate 22 at the left of the machine and the auxiliary frame-plate 56, and secured at its ends thereto, is a bar or guide 70 on which a carriage 71 is adapted to travel back and forth. This carriage is shown in detail in Figs. 16 and 17. The frame thereof is of rectangular form and has four rollers 72 secured to the rear face thereof, the two upper ones traveling on the upper edge of the bar 70 and the two lower ones traveling on the lower edge of that bar. To the bottom portion of the frame 71 are secured outwardly extending arms 73 one on either side of the sliding pinion 69, these arms being connected by a strip 74, the arms 73 embracing the pinion 69 so as to cause the pinion to move with the carriage. The screw 75 secures to the carriage a rack-bar 76 having rack teeth on the upper face thereof, this rack-bar being adapted to slide back and forth in hangers 77 (Figs. 14 and 18) secured to the rear face of the bar 70 and depending therefrom. Referring now to Figs. 14 and 15 it will be seen that the rear face of the bar 70 has a stud 78 thereon forming a pivot for a gear 79 and pinion 80 which are secured together. The gear 79 meshes with the rack 76. Secured to the carriage of the typewriter is a bar 81 the upper edge of which is preferably serrated. A short rack 82 is adapted to be secured to this bar 81 at any point along the length of the bar. Rack 82 is provided with an extension 83 (Fig. 11) adapted to extend under bar 81 and an extension 84 adapted to extend over bar 81 and to receive a thumb-screw 85. The end of this screw is adapted to engage a pressure-plate 86 so as to force that plate against the serrations on the upper surface of bar 81 and thus secure the rack 82 to the bar 81. This rack 82 when moved along by the carriage of the typewriter engages and operates the pinion 80. Rack 82 is also provided with a forwardly extending flange 93 adapted to travel under a flange 94 on a piece secured to the rear face of the bar 70 so as to insure engagement of rack 82 with pinion 80.

It is important that the sliding pinion should be prevented from moving at all times except when movement thereof is desired and I have therefore provided means for locking the pinion against movement except when the rack 82 engages the pinion 80. Pivotally mounted upon the rear face of the bar 70 are two locking levers 87 and 88 each provided with a projection 89 and acted upon by a spring 90 in a direction to carry the projection 89 into engagement with the teeth of the pinion 80. Each of the levers 87 and 88 is also provided with an upwardly extending projection 91 which, when the projections 89 are in locking position, lie in the path of the extension 83 on the rack 82, this extension forming a cam the sides of which are inclined. Just as the rack 82 engages the pinion 80, the cam 83 engages the upwardly-extending, overlapping portions 91 of the levers 87 and 88 and depresses those levers against the tension of the springs 90 so as to carry the projections 89 out of engagement with the teeth of the pinion 80 and thus unlock the actuating devices for effecting the travel of the master-pinion upon its shaft. The levers 87 and 88 may be provided with upwardly extending heels 92 which coact with the cams 83 to prevent movement of the levers 87 and 88 to unlocking position, while the rack 82 is approaching the pinion 80, but before it has come into engagement with the pinion. Extending between the sides plate 22 and the auxiliary plate 56 is a bar 95 upon which the totalizer is detachably mounted. This totalizer is supported on two side-plates 96 which at their lower ends are connected by a bar through which a screw 97 extends, this screw being adapted to engage the bar 95 so as to secure the totalizer thereto. In this way the totalizer can be readily detached and secured to bar 95 in any desired position along the length of that bar. Within the totalizer is a shaft 98 extending between the side-plates 96, on which shaft a plurality of wheels 99 are adapted to rotate freely. These wheels are adapted to be engaged and operated by the master-pinion 69 and they are herein termed the "number-wheels." These wheels 99 may be used to indicate the results of the operations in addition and subtraction by providing them with suitable numerals, but for convenience in displaying the results of the mathematical operations, I prefer to employ other wheels geared to the number-wheels 99 for this purpose. I have therefore shown a plurality of wheels 100 each geared to one of the wheels 99 and each meshing with a pinion 101 affixed to an indicating wheel 102, rotatable upon a shaft 103 extending between the side-plates 96. Each of the pinions 101 has ten teeth and on the periphery of each wheel 102 are arranged figures from zero to nine. The top and front of the totalizer is closed by a casing 104 secured to the side-plates 96 and having openings therein through which one figure on each of the wheels 102 may be seen. In the present instance each of the number-wheels 99 is shown as provided with twenty teeth, but the number of teeth may be ten or any multiple thereof.

The totalizer herein shown is provided with means whereby each of the number wheels is locked against operation so that it is held positively from moving at all times except when it is desired to operate the number wheel in the ordinary operation, or in the operation of carrying over from one wheel to the next adjacent wheel. This feature of the invention is of great importance for in this way accidental movement or displacement of a wheel such as would cause an erroneous calculation to be exhibited is effectually guarded against. This means for locking the number wheels is combined with the carrying mechanism for carrying over from one wheel to the next adjacent wheel and these mechanisms will now be described.

Extending between the side-frames 96 of the totalizer is a shaft 105 on which a plurality of pinions 106 are freely rotatable and laterally movable. Each of these pinions is provided with a circumferential groove adapted to receive pins extending toward each from the ends of bifurcated arms on a lever 107. Each of these levers 107 is pivotally mounted between two bars 108 and 109 extending between the side-frames 96, and the upper end of each lever enters an opening in a strip 110 extending between the side-frames 96. Each lever 107 has two pins 111 projecting from one side thereof, the ends of which are oppositely inclined as shown in Fig. 20. Extending between the side-frames 96 is a shaft 112 forming a pivotal support for a plurality of levers 113, one for each lever 107. The inner ends of these levers have their lateral edges beveled as shown in Fig. 20 and adapted to coact with the pins 111 on the levers 107. A spring 114 acts upon each lever 113 to hold it in the position in which it is shown in Fig. 18 and each lever 113 is guided in its rocking movement upon shaft 112 by having its forward edge enter a vertical slot in the bar 108. When any lever 113 is rocked upon its pivot against the tension of its spring 114, from the position shown in Fig. 23 to the position shown in Fig. 24, its beveled edges act upon the beveled pins 111 on the corresponding lever 107 to rock the latter on its pivot so as to move the pinion 106 to which that lever 107 is connected laterally upon its shaft 105. In Fig. 20 one of the levers 113 is shown as so moved, its lever 107 rocked and the corresponding pinion 106 moved laterally. When any pinion 106 is moved laterally thus, it is moved out of engagement with the locking device. One of these locking devices is provided for each of the pinions 106 and it consists of a bell-crank lever 115 (Fig. 23) adapted to rock freely upon a shaft 116 extending between the side-frames 96. One arm of this bell-crank lever is provided at its forward end with a downwardly extending tooth, which, when the corresponding pinion 106 is in normal position, engages with the teeth of that pinion to hold the pinion against movement except under certain conditions when the bell-crank lever is rocked so as to free the pinion as will be hereinafter described.

In Fig. 20 it will be seen that the pinion 106 which has been moved laterally is out of engagement with its locking lever 115, whereas the two pinions 106 on opposite sides of that pinion are in engagement with their locking levers 115. Each of the number-wheels 99 comprises three sections which are secured together or are formed integral. One of these sections is provided with a full complement of regularly-spaced gear-teeth 119, in the present instance twenty such teeth; next to it is a section having two teeth diametrically opposite each other as indicated at 117, in Figs. 20 and 24. Next to this section is a section having two depressions 118 diametrically opposite each other. Each pinion 106 meshes at all times with the teeth 119 of the corresponding number-wheel 99. When a pinion 106 is in its normal position it extends into the plane of the section of the number-wheel of lower denomination having the two diametrically opposite teeth 117 thereon. The lateral movement of any pinion 106 effected by levers 107 and 113, as above described, carries that pinion to such position that it cannot be actuated by the teeth 117 of the number-wheel of lower denomination, though the pinion still remains in mesh with the teeth 119 of the number-wheel of higher denomination. Each bell-crank lever 115 has a downwardly extending arm provided with a projection at its lower end adapted to enter one of the notches 118 in the gear-wheel which is of the lower denomination of the two connected by the pinion 106 which is locked by that bell-crank 115. The operation of these parts is as follows, reference being had principally to Fig. 20: Suppose the master-pinion is in mesh with the number-wheel indicated by the letter "A" in that figure. In that case the pinion between that number-wheel and the number-wheel of lower denomination will have been moved laterally as it is shown in Fig. 20, so that it will be out of engagement with the locking bell-crank lever 115 and will therefore be free to rotate. Also that pinion will have been moved out of the plane of the two teeth 117 on the number-wheel of lower denomination so that when the pinion is turned it cannot operate the gear-wheel of lower denomination. If the master-pinion be actuated it will cause rotation of the number-wheel A and the corresponding wheel 102 by which the result is indicated. When the actuation of the number-wheel A has been sufficient to require the carrying of one to the number-wheel of next higher denomination, one of the teeth 117 on the gear wheel A will engage and actuate the pinion 106 indicated by the letter B and will turn that pinion a distance equal to one tooth thereof. The pinion B, being in mesh with the number-wheel of next higher denomination, then the number-wheel A, indicated by the letter C, will cause that number-wheel to rotate a distance equal to one unit. It will be observed that the pinion B has not been moved laterally to carry it out of the plane of its locking lever 115, but this locking lever is rocked on its pivotal support 116 to raise it out of engagement with the pinion B while that pinion is moving a distance equal to one of its teeth. This rocking of the bell-crank is effected by the pinion B itself, the rocking of lever 115 at this time being permitted by one of the notches 118 on the number-wheel A, coming opposite the projection on the lower end of lever 115. One of these notches 118 on number-wheel A comes into position to permit the rocking of lever 115 just as one of the teeth 117 on number-wheel A comes into position to actuate the pinion B which carries one from the number-wheel A to the number-wheel C.

In order to assist in alining the pinions 106 to insure proper engagement therewith of the teeth 117 on the number-wheels, I have provided a plurality of levers 120, one for each of the pinions 106. Each of these levers 120 is pivotally mounted upon the shaft 116 and is actuated by a spring 121 to hold its free end down upon the corresponding pinion 106. The projection on each lever 120 which engages the teeth of the pinion 106 is inclined at its sides so that it will readily ride over the teeth of the pinion, when the pinion is moving in either direction.

I will now describe the means whereby the locking mechanism of each of the normally locked number-wheels is operated to unlock that wheel, to permit of actuating the wheel in the normal operation of the machine for addition or subtraction. I have above described the means for unlocking a wheel when necessary for the purpose of carrying one to that wheel. Each of the levers 113 is provided with a downwardly extending projection 122, these several projections being normally in alinement. Secured to the frame 71 which actuates the master-pinion is a bracket 123 (Figs. 16 and 17) on which a roller 124 is pivotally mounted so as to turn about a vertical axis. This bracket also carries an upwardly extending projection 125 having a cam surface thereon, this cam surface being displaced laterally from the roller 124. The roller 124 and the cam 125, therefore move back and forth with the master-pinion 69. When the master-pinion moves into engagement with a number-wheel 99, the roller 124 engages the projection 122 of the lever 113 governing the position of the pinion 106, which connects that number-wheel with the adjacent number-wheel of lower denomination, so that that pinion 106 will be automatically moved laterally to release it from its locking lever 115. Thus as the master-pinion moves successively from one number-wheel to the next one, the pinion connecting that number-wheel to the adjacent one of lower denomination, will be moved laterally to its unlocking position, while all of the other number-wheels will be held locked by their pinions 106 and locking levers 115, except when they are momentarily released to permit of carrying over from one wheel to the next. When the roller 124 moves away from the projection 122 on lever 113, that lever will be normally restored to initial position by the spring 114 so that the pinion 106 moved thereby will be restored to its normal and locked position. I prefer, however, to provide a positively acting means for restoring the locking device in this way. This is done by the cam 125 which travels along on the side of the projections 122 opposite that engaged by the roller 124 and which positively restores each lever 113 immediately after it has been disengaged by the roller 124, and that roller has moved to the next lever 113.

In order to position the numerals on wheels 102 accurately with respect to the openings in the casing 104, I have provided an alining device which is automatically actuated each time the master-pinion is moved from one wheel to the next adjacent wheel. This alining device consists of a pair of arms 126 pivotally mounted upon a shaft 127 extending between side-frames 96 and carrying at their free ends a bar 128; a spring 129 acts upon the arms 126 to depress them to a position in which they are arrested by a stop 130. The bar 128 is sharpened at its upper edge so that this edge will readily enter between the teeth 119 on the number-wheels 99 so as to accurately aline those wheels and the wheels 100 and 102 connected thereto. The lower edge of the bar 128 is provided with teeth, as shown in Fig. 19, the sides of which are inclined, these teeth being arranged at intervals corresponding with the intervals between the number-wheels 99. At the forward edge of the frame carrying the master-pinion and projecting forward from the strip 74 thereof is a stud 131 (Figs. 16 and 17) the sides of which are inclined and this stud is adapted to engage the teeth on the lower edge of the bar 128. As the master-pinion is moved from one number-wheel to the next one, the stud 131 engages a tooth on bar 128 and raises that bar against the tension of spring 129 so as to force the upper edge of the bar in between the teeth on each of the number-wheels 99. When the master-pinion comes to rest in coaction with a number-wheel, the stud 131 has moved to a position midway between two teeth on bar 128, and spring 129 then forces the bar out of coaction with the number-wheels, so that the master-pinion may actuate the number-wheel with which it is then in mesh.

Secured to frame 71 and projecting upwardly therefrom is an index 132 the upper end of which is bent forwardly and is adapted to travel along an index-plate 133 secured to the top of the casing on the totalizer and provided with markings as shown in Fig. 15. This index moving with the master-pinion and scale serve to show which number-wheel, that is, which column, will be affected by the operation of the master-pinion.

Having described my invention, what I claim as new therein and desire to secure by Letters Patent of the United States is:

1. The combination of a typewriter having a row of numeral keys, a shaft extending across the front of the machine parallel to said row, mechanism actuated by said keys for turning said shaft a distance corresponding to the value of the key depressed, means for rendering said mechanism operative or inoperative to turn said shaft, a second shaft extending across the front of the machine parallel to said shaft and driven thereby, a master-pinion slidable thereon, means for moving said pinion, and a totalizer actuated by said pinion, substantially as set forth.

2. The combination of a typewriter having a row of numeral keys, a shaft extending across the front of the machine parallel to said row, mechanism actuated by said keys for turning said shaft a distance corresponding to the value of the key depressed, a second shaft extending across the front of the machine parallel to said shaft, gearing between said shafts, means for reversing the direction of drive of said gearing for addition or subtraction, a mastering pinion slidable on said second shaft, means for moving said pinion, and a totalizer actuated by said pinion, substantially as set forth.

3. The combination of a typewriter having a row of numeral keys, a shaft extending across the front of the machine parallel to said row, mechanism actuated by said keys for turning said shaft a distance corresponding to the value of the key depressed, means for disconnecting the shaft from said mechanism and simultaneously locking the shaft against rotation, a second shaft extending across the front of the machine parallel to said shaft and driven thereby, a master-pinion slidable on said second shaft, means for moving said pinion, and a totalizer actuated by said pinion, substantially as set forth.

4. The combination of a typewriter having a row of numeral keys, a shaft extending across the front of the machine parallel to said row, mechanism actuated by said keys for turning said shaft a distance corresponding to the value of the key depressed, means for disconnecting the shaft from said mechanism and simultaneously locking the shaft against rotation, a second shaft extending across the front of the machine parallel to said shaft and driven thereby, gearing between said shafts, means for reversing the direction in which said second shaft is driven by said gearing for addition or subtraction, a pinion slidable upon said second shaft, means for moving the pinion, a bar parallel to said second shaft and a totalizer detachably mounted upon said bar, substantially as set forth.

5. The combination of a typewriter having a row of numeral keys, a shaft extending across the front of the machine parallel to said row, mechanism actuated by said keys for turning said shaft a distance corresponding to the value of the key depressed, means for disconnecting the shaft from said mechanism and simultaneously locking the shaft against rotation, a second shaft extending across the front of the machine parallel to said shaft and driven thereby, gearing between said shafts, means for reversing the direction in which said second shaft is driven by said gearing for addition or subtraction, a pinion slidable upon said second shaft, a carriage for said typewriter, means adjustably mounted on the carriage for moving said pinion in correspondence with but at a greater rate than the movement of said carriage, a bar parallel to said second shaft and a totalizer detachably mounted upon said bar, substantially as set forth.

6. The combination of a plurality of keys, a shaft adapted to be driven thereby, a plurality of rotatable driving members for operating said shaft, a connection from each key to one of said members, and means actuated by the depression of a key for moving the corresponding member about an axis eccentric thereto to carry it into driving relation to said shaft and then operating the member, substantially as set forth.

7. The combination of a plurality of keys, a shaft adapted to be driven thereby, a plurality of rotatable driving members for operating said shaft, a connection from each key to one of said members, means actuated by the depression of a key for moving the corresponding member about an axis eccentric thereto to carry it into driving relation to said shaft and then operating the member, means for returning a depressed key to initial position, and means operated on the return of a depressed key for disconnecting said member and shaft, substantially as set forth.

8. The combination of a plurality of keys, a shaft adapted to be driven thereby, a plurality of driving members for operating said shaft, a connection from each key to one of said members, means actuated by the depression of a key for moving the corresponding member bodily in the plane in which it lies into driving relation to said shaft and then operating the member, and means for preventing overthrow of said member when actuated by its key, substantially as set forth.

9. The combination of a plurality of keys, a shaft adapted to be driven thereby, a plurality of driving members for operating said shaft, a connection from each key to one of said members, means actuated by the depression of a key for moving the corresponding member bodily in the plane in which it lies into driving relation to said shaft and then operating the member, means for returning a depressed key to initial position, means operated on the return of a depressed key for disconnecting said member and shaft, means for returning the member and shaft, means for returning the member to initial position when so disconnected, and means for preventing excessive movement of the member when so returned, substantially as set forth.

10. The combination of a plurality of keys, a shaft adapted to be rotated thereby, a plurality of gears on said shaft, a plurality of driving gears each corresponding to one of said gears, a plurality of members each connected to one of said keys, and means actuated by any member when moved by the depression of a key for first moving a driving gear in the plane in which it lies into mesh with the corresponding gear on said shaft and then rotating the driving gear a distance corresponding to the value of the key depressed, substantially as set forth.

11. The combination of a plurality of keys, a shaft adapted to be rotated thereby, a plurality of gears on said shaft, a plurality of driving gears each corresponding to one of said gears, a plurality of members each connected to one of said keys, means actuated by any member when moved by the depression of a key for first moving a driving gear about an axis eccentric thereto into mesh with the corresponding gear on said shaft and then rotating the driving gear a distance corresponding to the value of the key depressed, and means for limiting the extent of rotation of each of said driving gears in both directions, substantially as set forth.

12. The combination of a plurality of keys, a shaft, a plurality of gears on said shaft, a plurality of driving gears each corresponding to one of said gears, a plurality of pivotally mounted members on each of which one of the driving gears is mounted, and means actuated by the depression of a key for turning one of said members on its pivot to carry the driving gear thereon into mesh with the corresponding gear on said shaft and then rotating the driving gear a distance corresponding to the value of the key depressed, substantially as set forth.

13. The combination of a plurality of keys, a shaft adapted to be rotated thereby, a plurality of gears on said shaft, a plurality of driving gears each corresponding to one of said gears, a connection from each key to one of said driving gears, means actuated by the depression of a key for moving the driving gear connected thereto into mesh with the corresponding gear on said shaft and then turning said driving gear, means for returning a depressed key to initial position, means operated when a depressed key is returned for disconnecting said driving gear from the corresponding gear on said shaft, a spring for returning each driving gear to initial position, and means for preventing excessive return movement of the driving gear, substantially as set forth.

14. The combination of a plurality of keys, a shaft, a plurality of gears thereon, a plurality of driving gears each corresponding to one of said gears, a plurality of pivotally mounted frames on each of which one of said driving gears is pivotally mounted, a connection from each key to one of said frames, and means operated by the depression of any key for rocking the corresponding frame to carry the driving gear thereon into mesh with the corresponding gear on said shaft and for then actuating the driving gear to rotate the shaft, substantially as set forth.

15. The combination of a plurality of keys, a shaft, a plurality of gears thereon, a plurality of driving gears each corresponding to one of said gears, a plurality of pivotally mounted frames on each of which one of said driving gears is pivotally mounted, means connecting each key to a frame and actuated by the depression of a key for rocking the corresponding frame to carry its driving gear into mesh with the corresponding gear on said shaft and for then actuating the driving gear to rotate the shaft, and means for preventing excessive movement of said driving gear, substantially as set forth.

16. The combination of a plurality of keys, a shaft, a plurality of gears thereon, a plurality of driving gears normally out of engagement with said gears, means for moving any driving gear bodily in the plane in which it lies to carry it into engagement with the corresponding gear on said shaft, and means for actuating the several driving gears by said keys amounts corresponding to the values of the keys, substantially as set forth.

17. The combination of a plurality of keys, a shaft, a plurality of gears thereon, a plurality of driving gears normally out of engagement with said gears, means for moving any driving gear bodily in the plane in which it lies to carry it into engagement with the corresponding gear on said shaft, means for actuating the several driving gears by said keys amounts corresponding to the value of the keys, and means for rendering all of said driving gears inoperative to actuate said shaft, substantially as set forth.

18. The combination of a shaft, a gear thereon, a pivotally mounted support, a driving gear rotatably mounted thereon, a pivotally mounted member having a cam surface thereon adapted to actuate said support to carry said driving gear into mesh with said gear, a key, a connection from said key to said member, and means for actuating said driving gear to rotate said shaft, substantially as set forth.

19. The combination of a shaft, a gear thereon, a pivotally mounted support, a driving gear rotatably mounted thereon, a pivotally mounted member having a cam surface thereon adapted to actuate said support to carry said driving gear into mesh with said gear, a key, a connection from said key to said member, and means actuated by the depression of a key for actuating said driving gear to rotate said shaft, substantially as set forth.

20. The combination of a shaft, a gear thereon, a pivotally mounted support, a driving gear rotatably mounted thereon, a pivotally mounted member having a cam surface thereon adapted to actuate said support to carry said driving gear into mesh with said gear, a key, a connection from said key to said member, means for actuating said driving gear to rotate said shaft, and means for preventing excessive movement of said driving gear when so actuated, substantially as set forth.

21. The combination of a shaft, a gear thereon, a pivotally mounted support, a driving gear rotatably mounted thereon, a pivotally mounted member having a cam surface thereon adapted to actuate said support to carry said driving gear into mesh with said gear, a key, a connection from said key to said member, means for actuating said driving gear to rotate said shaft, a spring for returning said driving gear, and means for limiting the return movement of said driving gear, substantially as set forth.

22. The combination of a shaft, a gear thereon, a pivotally mounted support, a driving gear rotatably mounted thereon, a pivotally mounted member having a cam surface thereon adapted to actuate said support to carry said driving gear into mesh with said gear, a key, a connection from said key to said member, means on said member for actuating said driving gear to rotate said shaft, means for limiting the movement of the driving gear actuated by said member, a spring for returning the driving gear and means for limiting the movement actuated by said spring, substantially as set forth.

23. The combination of a shaft, a gear thereon, a movable support, a driving gear pivotally mounted thereon, a movable member having a cam surface thereon adapted to actuate said support to carry said driving gear into mesh with said gear, a key, a connection from said key to said member, and means on said member for actuating said driving gear to rotate said shaft, substantially as set forth.

24. The combination of a shaft, a gear thereon, a movable support, a driving gear pivotally mounted thereon, a movable member having a cam surface thereon adapted to actuate said support to carry said driving gear into mesh with said gear, a key, a connection from said key to said member, means on said member for actuating said driving gear to rotate said shaft, and means for limiting the movement of said driving gear when so actuated, substantially as set forth.

25. The combination of a shaft, a gear thereon, a movable support, a driving gear pivotally mounted thereon, a movable member having a cam surface thereon adapted to actuate said support to carry said driving gear into mesh with said gear, a key, a connection from said key to said member, means on said member for actuating said driving gear to rotate said shaft, and means driving gear to rotate said shaft, and means on said member for enforcing complete movement thereof in both directions, substantially as set forth.

26. The combination of a shaft, a gear thereon, a movable support, a driving gear pivotally mounted thereon, means for moving said support to carry said driving gear into mesh with said gear, key-controlled mechanism for actuating said driving gear, and a projection on said driving gear coacting with said support to limit the movement of the driving gear, substantially as set forth.

27. The combination of a shaft, a gear thereon, a movable support, a driving gear pivotally mounted thereon, means for moving said support to carry said driving gear into mesh with said gear, an actuating member for said driving gear, key-controlled mechanism for reciprocating said member, said member being adapted to actuate the driving gear when moving in one direction and to return free of said driving gear, and means for returning the driving gear to initial position, substantially as set forth.

28. The combination of a shaft, a gear thereon, a movable support, a driving gear pivotally mounted thereon, means for moving said support to carry said driving gear into mesh with said gear, an actuating member for said driving gear, key-controlled mechanism for reciprocating said member, teeth on said member adapted to mesh with the teeth of the driving gear, means on said member additional to said teeth for engaging and operating the driving gear, said member being adapted to return to initial position without actuating the gear, and means for returning the driving gear to initial position, substantially as set forth.

29. The combination of a shaft, a plurality of gears thereon, a plurality of driving gears corresponding to said gears, a plurality of key-actuated reciprocating members any one of which may be actuated to move the corresponding driving gear into mesh with a gear on said shaft, then actuate the driving gear a predetermined amount and then return to initial position free of the driving gear, and means for returning the driving gear to initial position, substantially as set forth.

30. The combination of a shaft, a plurality of gears thereon, a plurality of driving gears corresponding to said gears, a plurality of key-actuated reciprocating members any one of which may be actuated to move the corresponding driving gear into mesh with a gear on said shaft, then actuate the driving gear a predetermined amount and then return to initial position free of the driving gear, means for returning the driving gear to initial position and means for limiting the movement of the driving gear in both directions, substantially as set forth.

31. The combination of a shaft, a plurality of gears thereon, a plurality of driving gears corresponding to said gears, a plurality of key-actuated reciprocating members any one of which may be actuated to move the corresponding driving gear into mesh with a gear on said shaft, then actuate the driving gear a predetermined amount and then return to initial position free of the driving gear, means for returning the driving gear to initial position, and means for insuring complete movement of said member in both directions, substantially as set forth.

32. The combination of a typewriting machine having a carriage, a totalizer, an operating gear for said totalizer and means actuated by said carriage for effecting relative movement of said totalizer and gear comprising a rack on said carriage, a gear actuated thereby, a second rack operated by said gear, and means for locking said gear and said second rack against movement except when said rack on the carriage is in engagement with said gear, substantially as set forth.

33. The combination of a typewriting machine having a carriage, a totalizer, an operating gear for said totalizer and means actuated by said carriage for effecting relative movement of said totalizer and gear comprising a rack adjustably mounted on said carriage, two gears mounted on the typewriter frame and rotatable about the same axis, one of said gears meshing with said rack, a second rack meshing with the other of said gears, a lock for said gears and said second rack, and means on said carriage for releasing said lock when said rack on the carriage engages the coöperating gear, substantially as set forth.

34. The combination of a typewriting machine having a carriage, a totalizer, an operating gear for said totalizer and means actuated by said carriage for effecting relative movement of said totalizer and gear comprising a rack on the carriage, a gear mounted on the typewriter frame and coacting with said rack, a second rack meshing with said gear, a spring-actuated lock mounted on the typewriter frame and controlling said gear, and means on said carriage for releasing said lock and holding it released while the rack on the carriage is in coaction with said gear, substantially as set forth.

35. In a calculating machine the combination of a totalizer having a plurality of number-wheels, a master-pinion, means for actuating the master-pinion and for effecting relative movement of the master-pinion and totalizer, a plurality of pinions each adapted to mesh with a number-wheel, a lock for each pinion, means for moving each pinion out of coaction with its lock, and means for moving each lock out of coaction with its pinion, substantially as set forth.

36. In a calculating machine, the combination of a totalizer having a plurality of number-wheels thereon, a master-pinion, means for actuating the master-pinion and for effecting relative movement of the master-pinion and totalizer, means for locking the number-wheels of the totalizer, means for releasing the number-wheels to permit of actuating them, and means for positively actuating said locking means to lock the number-wheels after they have been released, substantially as set forth.

37. In a calculating machine, the combination of a totalizer having a plurality of number-wheels, a master-pinion, means for actuating the master-pinion and for effecting relative step-by-step movement of the master pinion and totalizer, a plurality of locking mechanisms one for each number-wheel, means for actuating said locking mechanisms one at a time during the relative movement of the master-pinion and totalizer so that only the number-wheel in coaction with the master-pinion will be unlocked by its locking mechanism, an alining device for accurately alining all the number-wheels of the totalizer and means for actuating said alining device once during each step of the relative movement of the master-pinion and totalizer, substantially as set forth.

38. In a calculating machine, the combination of a totalizer having a plurality of number-wheels thereon a master-pinion, key-actuated devices for operating the master-pinion, means for moving the master-pinion step-by-step to carry it into position to operate the number-wheels successively, a lock for each number-wheel, means moving with the master-pinion for operating said locks to release the number-wheels, and means moving with the master-pinion for operating said locks to cause them to lock the number-wheels, substantially as set forth.

39. In a calculating machine, a totalizer having a plurality of number-wheels rotatable about the same axis, a shaft parallel to said axis, a plurality of pinions on said shaft each adapted to mesh with two adjacent number-wheels, a locking device coacting with each of said pinions, and means for moving each of said pinions axially to carry it into and out of engagement with its locking device, substantially as set forth.

40. In a calculating machine, a totalizer having a plurality of number-wheels rotatable about the same axis, a shaft parallel to said axis, a plurality of pinions on said shaft each adapted to mesh with two adjacent number-wheels, a locking device coacting with each of said pinions, and means for effecting relative movement of each of said pinions and its locking device to lock and release the pinion, substantially as set forth.

41. In a calculating machine, a totalizer having two number-wheels rotatable about the same axis, a shaft parallel to said axis, a pinion on said shaft adapted to mesh with both of said number-wheels, the wheel of lower denomination having one tooth adapted to actuate the pinion for each ten teeth on the wheel of higher denomination adapted to be actuated by the pinion, and a pivoted lever adapted to engage the pinion and to be actuated to release the pinion when the pinion is actuated by the wheel of lower denomination, substantially as set forth.

42. In a calculating machine, the combination of a shaft, a plurality of number-wheels on the shaft each having three parts one provided with regularly-shaped teeth, one having one tooth for each ten of said teeth and one having a depression for each tooth on said second part, a second shaft, a plurality of pinions thereon each adapted to mesh with two adjacent wheels and a pivoted locking lever for each of said pinions adapted to rock on its pivot to release its pinion by having a portion of the lever enter one of said depressions in a number-wheel, substantially as set forth.

43. In a calculating machine, the combination of a shaft, a plurality of number-wheels on the shaft each having a part provided with regularly-spaced teeth and a part provided with one tooth for each ten of said teeth, a second shaft, a plurality of pinions thereon each adapted to mesh with two adjacent number-wheels, a lock for each pinion, and means for moving each pinion laterally to release it from said lock and to carry it out of coaction with the wheel of lower denomination, substantially as set forth.

44. In a calculating machine, the combination of a shaft, a plurality of number-wheels on the shaft each having a part provided with regularly-spaced teeth and a part provided with one tooth for each ten of said teeth, a second shaft, a plurality of pinions thereon each adapted to mesh with two adjacent number-wheels, a master-pinion, means for moving the same into coaction with the number-wheels, and means actuated when the master-pinion is moved into coaction with a number-wheel for moving one of the pinions which coact with that number-wheel axially out of coaction with the number-wheel of next lower denomination, substantially as set forth.

45. The combination with a typewriter having a row of number-keys, of a shaft extending across the typewriter parallel to said row, mechanism actuated by said keys for turning said shaft a distance corresponding to the value of the key depressed, a second shaft extending across the machine parallel to said shaft, gearing between said shafts, a master-pinion slidable upon said second shaft, means for moving said pinion, a bar mounted upon the frame of the typewriter parallel to said shafts, and a totalizer adapted to be mounted on said bar in various positions along the length thereof and to be actuated by said master-pinion, substantially as set forth.

46. The combination with a typewriter having a plurality of number-keys, of a shaft extending across the typewriter, a plurality of mechanisms each actuated by one of the number-keys to move into engagement with said shaft and actuate the shaft a distance corresponding to the value of the key depressed, a second shaft extending across the machine parallel to said shaft, gearing between said shafts, a master-pinion slidable upon said second shaft, means for moving said pinion, a support mounted upon the typewriter parallel to said shafts, and a totalizer adapted to be mounted upon said support in various positions along the length thereof and to be actuated by said master-pinion, substantially as set forth.

47. The combination with a typewriter having a plurality of number-keys, of a shaft extending across the typewriter, a plurality of mechanisms each actuated by one of the number-keys to move into engagement with said shaft and actuate the shaft a distance corresponding to the value of the key depressed, a second shaft extending across the machine parallel to said shaft, gearing between said shafts, a master-pinion slidable upon said second shaft, means for moving said pinion, a support mounted upon the typewriter parallel to said shafts, and a totalizer adapted to be mounted upon said support in various positions along the length thereof and to be actuated by said master-pinion, and means for rendering the key-actuated mechanism for moving said first shaft operative and inoperative, substantially as set forth.

48. The combination with a typewriter having a plurality of number-keys, of a shaft extending across the typewriter, a plurality of mechanisms each actuated by one of the number-keys to move into engagement with said shaft and actuate the shaft a distance corresponding to the value of the key depressed, a second shaft extending across the machine parallel to said shaft, gearing between said shafts, a master-pinion slidable upon said second shaft, means for moving said pinion, a support mounted upon the typewriter parallel to said shafts, a totalizer adapted to be mounted upon said support in various positions along the length thereof and to be actuated by said master-pinion, means for rendering the key-actuated mechanism for moving said first shaft operative and inoperative, and means for effecting reversal of the gearing between said shafts for addition and subtraction, substantially as set forth.

49. The combination of a typewriter having a plurality of number-keys, a shaft having a plurality of gears thereon, a plurality of driving gears each actuated by one of said keys to move into engagement with one of the gears on said shaft, turn the gear a distance corresponding to the value of the key depressed and then disengage the gear on said shaft, a spring for each driving gear for returning the gear to initial position when it disengages the gear on said shaft, a second shaft extending across the machine, gearing between said shafts, a master-pinion slidable on said second shaft, means for moving said pinion, a support mounted parallel to said second shaft, and a totalizer adapted to be mounted upon said support in various positions along the length thereof and to be actuated by said master-pinion, substantially as set forth.

This specification signed and witnessed this 12th day of December, 1910.

CHARLES E. PRATT.

Witnesses:
A. G. DICUS,
A. B. DICK.

Copies of this patent may be obtained for five cents each, by addressing the "Commissioner of Patents, Washington, D. C."